US007036025B2

(12) United States Patent
Hunter

(10) Patent No.: US 7,036,025 B2
(45) Date of Patent: Apr. 25, 2006

(54) METHOD AND APPARATUS TO REDUCE POWER CONSUMPTION OF A COMPUTER SYSTEM DISPLAY SCREEN

(75) Inventor: Robert J. Hunter, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 10/071,744

(22) Filed: Feb. 7, 2002

(65) Prior Publication Data

US 2003/0146897 A1 Aug. 7, 2003

(51) Int. Cl.
*G06F 13/14* (2006.01)

(52) U.S. Cl. ...................... 713/300; 713/323; 713/324; 700/12; 700/14; 700/15

(58) Field of Classification Search ................ 713/324, 713/323, 300; 700/12, 13, 14, 15; 345/590
See application file for complete search history.

(56) References Cited

U.S. PATENT DOCUMENTS 5,796,382 A * 8/1998 Beeteson .................... 345/102
5,933,130 A * 8/1999 Wagner ...................... 345/690
5,936,608 A * 8/1999 Springer .................... 345/690
6,005,538 A * 12/1999 Hoekstra ..................... 345/47
6,556,253 B1 * 4/2003 Megied et al. ............. 348/565
6,661,428 B1 * 12/2003 Kim .......................... 345/690
6,738,041 B1 * 5/2004 Silber ........................ 345/158
6,738,055 B1 * 5/2004 Abe et al. .................. 345/211
6,791,566 B1 * 9/2004 Kuratomi et al. ........... 345/589
6,801,811 B1 * 10/2004 Ranganathan et al. ........ 700/22
6,812,907 B1 * 11/2004 Gennetten et al. ........... 345/1.3

* cited by examiner

*Primary Examiner*—A Elamin
(74) *Attorney, Agent, or Firm*—David N. Tran

(57) ABSTRACT

In accordance with an embodiment of the present invention, a computer system may determine focus areas and non-focus areas of the display screen. The brightness of non-focus areas may then be reduced with respect to focus areas, thereby reducing power consumption of the display screen and, hence, reducing power consumption of the computer system. For example, a focus area may be an active window of the display screen and a non-focus area may be an inactive window of the display screen. As another example, a focus area may be a region of the display screen within a vicinity of a cursor (i.e. data entry point), and a non-focus area may be the region outside this vicinity. The size of the vicinity may be measured in radius or in lines of data (e.g. in a word processing or spreadsheet program) surrounding the cursor. The size and shape of the vicinity may be determined by a user.

22 Claims, 4 Drawing Sheets

METHOD AND APPARATUS TO REDUCE POWER CONSUMPTION OF A COMPUTER SYSTEM DISPLAY SCREEN

The present invention relates to computer systems and more particularly to a power savings technique in which the brightness of portions of a display screen of the computer system may be independently adjusted to reduce power.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. Computer systems typically include one or more processors. A processor may manipulate and control the flow of data in a computer. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One approach to reducing overall power consumption of a computer system is to change the focus of power reduction from the processor to other components that have a significant impact on power. For example, display screens of computer systems typically consume a significant amount of power. For many backlit liquid crystal display (LCD) screens, increasing the brightness of the display screen typically increases its power consumption, and decreasing the brightness of the display screen typically decreases its power consumption. Therefore, it is generally in a user's best interest to lower the average brightness of the display screen over time.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a computer system may determine focus areas and non-focus areas of the display screen. The brightness of non-focus areas may then be reduced with respect to focus areas, thereby reducing power consumption of the display screen and, hence, reducing power consumption of the computer system. For example, a focus area may be an active window of the display screen and a non-focus area may be an inactive window of the display screen. As another example, a focus area may be a region of the display screen within a vicinity of a cursor (i.e. data entry point), and a non-focus area may be the region outside this vicinity. The size of the vicinity may be measured in radius from the cursor or in lines of text above and/or below the line containing the cursor (e.g. in a word processing or spreadsheet program). The size and shape of the vicinity may be determined by a user.

A more detailed description of embodiments of the present invention, including various configurations and implementations, is provided below.

Figure 1:
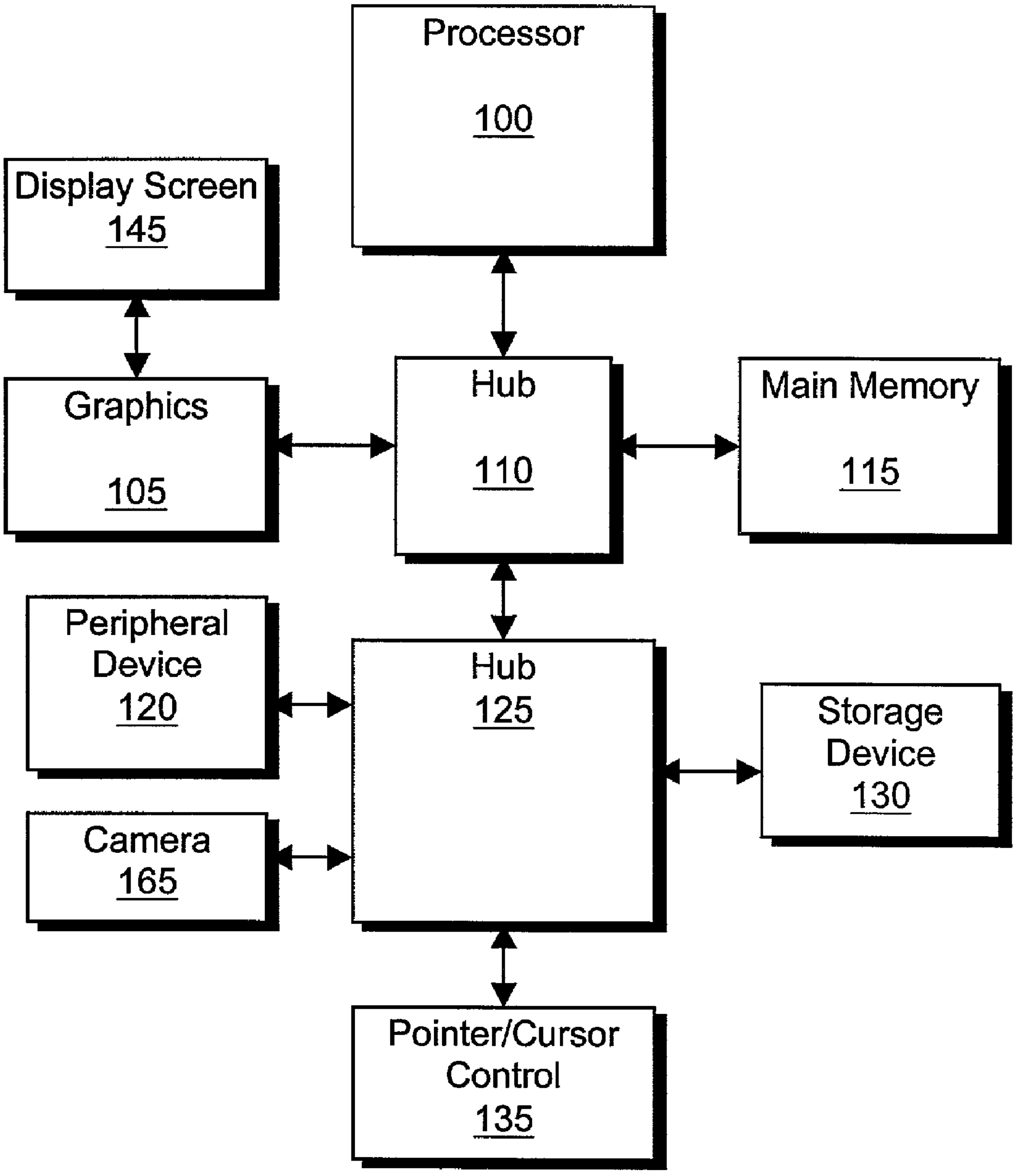
FIG. 1 includes a computer system formed in accordance with an embodiment of the present invention.

FIG. 1 includes a computer system that may be formed in accordance with an embodiment of the present invention. As shown, the computer system may include a processor 100 coupled to hub 110. Processor 100 may communicate with graphics controller 105, main memory 115, and hub 125 via hub 110. Graphics controller 105 may be coupled to display screen 145. Hub 125 may couple peripheral device 120 (which may be any one or more of a number of input/output devices), storage device 130, pointer/cursor control 135, and camera 165 to hub 110.

In accordance with one embodiment of the present invention, pointer/cursor control 135 of FIG. 1 may include, for example, arrow keys on a keyboard, a mouse, a touch screen, a touch pad, a trackball, or any other pointer or cursor control device. For one embodiment, pointer/cursor control 135 may provide the user with a means by which the user may identify a focus area of the display screen, e.g. by selecting a window to activate or by determining a data input position in a document. For convenience, pointer/cursor control 135, which is intended to indicate either a pointer or cursor control device, may be referred to herein as a cursor control device, and pointers and cursors may be collectively referred to herein as cursors.

Camera 165 of FIG. 1 may also function as a cursor control device to determine a focus area on display screen 145. For example, camera 165 may provide an image of a user's face for use in determining where on the display screen the user may be looking. For one embodiment of the invention, a focus area may be the portion of the display screen at which the user is looking. In accordance with one embodiment of the present invention, camera 165 of FIG. 1 may serve alternate purposes beyond focus area detection. For example, camera 165 may enable video imaging functions such as still photo capturing, video recording, teleconferencing, etc.

A method of an embodiment of the present invention may be implemented by the computer system of FIG. 1 programmed to execute instructions associated with the method. These instructions may reside, at least in part, in any machine-readable medium such as a magnetic disk (e.g. a hard drive or floppy disk), an optical disk (e.g. a CD or DVD), a semiconductor device (e.g. Flash, EPROM, or RAM), or a carrier wave (e.g. an electrical or wireless data signal), all of which are collectively represented by storage device 130 of FIG. 1.

In accordance with an embodiment of the present invention, a computer system may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

Figure 2:
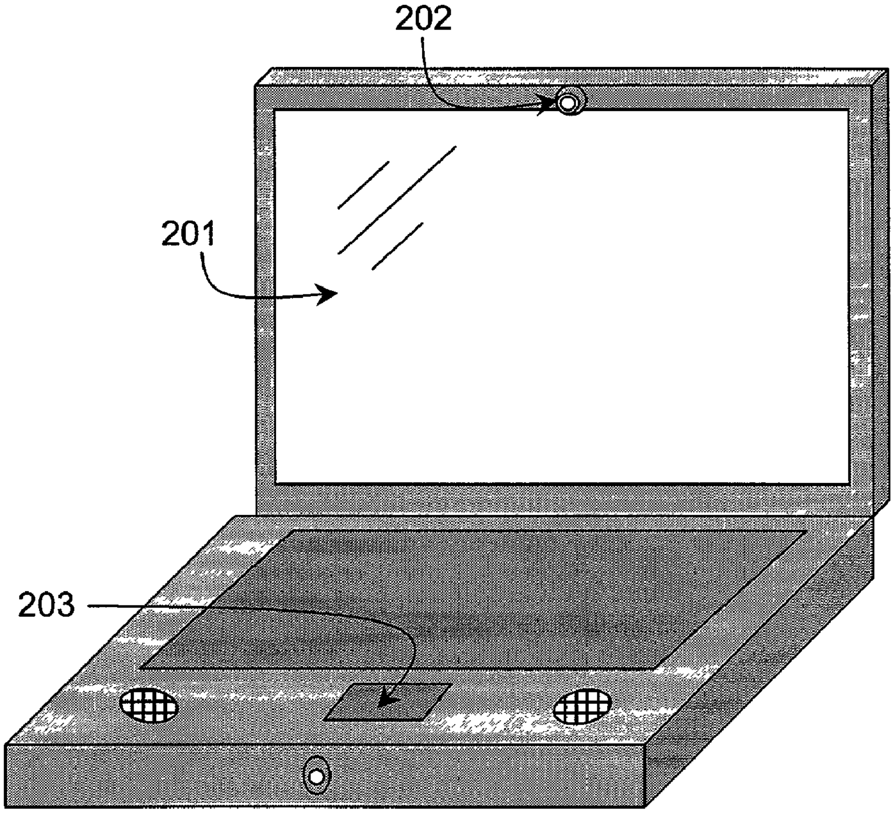
FIG. 2 includes a computer system formed in accordance with an embodiment of the present invention.

FIG. 2 includes a "clam shell" mobile computer system (e.g. a laptop, notebook, sub-notebook, etc.) formed in accordance with an embodiment of the present invention. The computer system includes a flat panel display screen 201, a cursor control, and a camera 202. Camera 202 may be used to provide an image to be analyzed to determine a focus area of display screen 201, as described above. In accordance with an alternate embodiment of the present invention, cursor control 203 and camera 202 may be located elsewhere on the computer system chassis or may be separated from the chassis via a wired or wireless connection.

Figure 3:
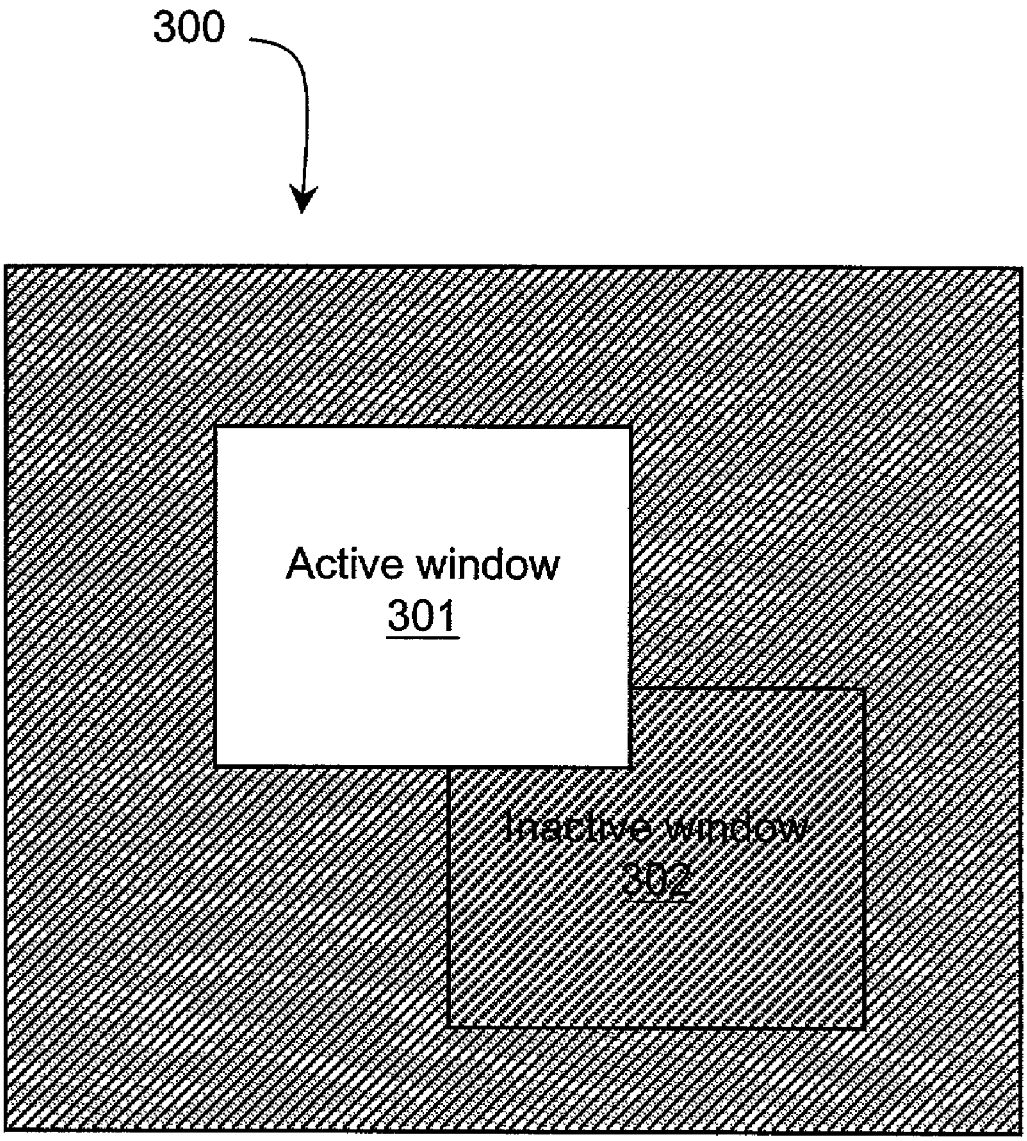
FIG. 3 includes an image in accordance with an embodiment of the present invention.

FIG. 3 includes an image on display screen 300 formed in accordance with an embodiment of the present invention, including active window 301 and inactive window 302. In accordance with one embodiment of the present invention, active window 301 may be the focus area of the display screen and the remainder of the display screen, including inactive window 302 and the surrounding region (such as the desktop, toolbars, icons, etc.), may be the non-focus area. For one embodiment, the brightness of the non-focus area of the display screen may be decreased in accordance with a display power management protocol to reduce power consumption of the display screen.

For one embodiment of the present invention, the brightness of at least a portion of the non-focus area of the display screen may be decreased to approximately zero, making the portion indiscernible. In accordance with an alternate embodiment of the present invention, the brightness of at least a portion of the non-focus area of the display screen may be merely dimmed, making the portion obscured but still discernible. In accordance with one embodiment of the present invention, the amount by which the brightness of the portion may be decreased may be defined according to a predetermined user preference setting in the computer system. For one embodiment, a screen may include two or more separate focus areas, such as two separate windows, or two or more separate non-focus areas.

A display screen formed in accordance with an embodiment of the present invention, such as display screen 300 of FIG. 3, may include a backlit liquid crystal display (LCD). For this embodiment of the present invention, the display screen may include two or more backlights, the power to which may be independently controllable. For example, for this embodiment, display screen 300 of FIG. 3 may include one or more backlights behind active window 301 and one or more backlights behind the remainder of the screen.

In accordance with this embodiment, after active window 301 of FIG. 3 becomes the focus area, power to the one or more backlights behind active window 301 may increase (or remain unchanged if window 301 was already bright). This has the effect of increasing the brightness of the display screen in that region. For this embodiment, power to the one or more backlights behind at least a portion of the remainder of display screen 300, e.g. at least a portion of the non-focus area, may be decreased, thereby decreasing the brightness in that region. If window 302 subsequently becomes the focus area of display screen 300, power to the one or more backlights behind window 301 may be decreased, thereby decreasing the brightness in that region, and power to the one or more backlights behind window 302 may be increased, thereby increasing the brightness in that region.

In accordance with an alternate embodiment of the present invention, display screen 300 of FIG. 3, may include one or more light emitting pixels (or sub-pixels), such as a light emitting diode (LED) or a plasma display element. For this embodiment of the present invention, the power consumption of each pixel of the display screen may increase as the brightness of the pixel increases.

Figure 4:
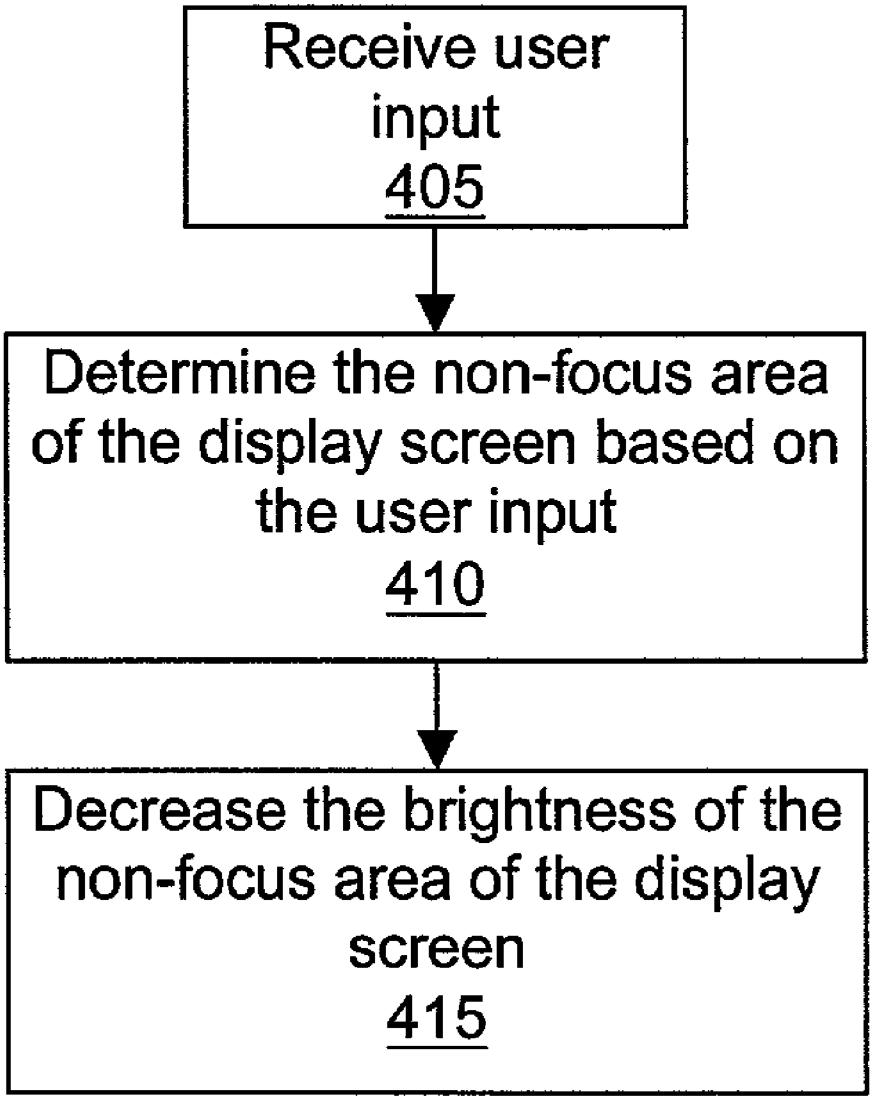
FIG. 4 includes a flow chart showing a method of an embodiment of the present invention

FIG. 4 includes a flow chart showing a method of an embodiment of the present invention. At block 405, input is received from a user. This input may be, for example, cursor control or data entry. For an alternate embodiment of the present invention, this input may be eye movement or other gesture detected by a camera of the computer system.

Next, at block 410, this user input is used to determine a non-focus area of the display screen. In response to this determination, the brightness of the non-focus area of the display screen is decreased at block 415 in accordance with a display power management protocol.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer system, comprising:

a display screen; and a camera coupled to the display screen and configured as a cursor control device to select one or more portions of the display screen to be brighter than remaining portions of the display screen in accordance with a display power management protocol, wherein an image of a user's face captured by the camera is to be analyzed to determine position of a cursor.

2. The computer system of claim 1, wherein the display screen includes a plurality of backlights.

3. The computer system of claim 2, wherein the backlights are to be independently controlled in accordance with the protocol.

4. The computer system of claim 1, wherein the display screen includes a plurality of light emitting pixels.

5. The computer system of claim 4, wherein the light emitting pixels are to be independently controlled in accordance with the protocol.

6. The computer system of claim 1, wherein the one or more portions of the display screen selected by the cursor control device is to be brighter than the remaining portions by an amount to be defined according to a user preference.

7. The computer system of claim 1, wherein the cursor control device controls position of a pointer or of the cursor.

8. The computer system of claim 7, wherein the one or more portions is to include at least a portion of an active window, and the remaining portions are to include at least a portion of an inactive window.

9. The computer system of claim 1, wherein the one or more portions is to be within an active window within a vicinity of the cursor, and the remaining portions are to be within the active window beyond the vicinity of the cursor.

10. The computer system of claim 1, further comprising a storage device storing focus detection code to be executed by the computer system, the focus detection code to determine the one or more portion of the display screen using input from the camera.

11. A method, comprising:

providing a computer system with a display screen and a camera; and enabling brightness of one or more portions of the display screen to be adjusted with respect to a remaining portion of the display screen image of a user's face captured by the camera to determine a position of the display screen the user is looking and in accordance with a display power management protocol.

12. The method of claim 11, wherein enabling the brightness of the or more portions of the display screen to be adjusted comprises enabling the brightness to be decreased to reduce power consumed by the display screen.

13. The method of claim 11, wherein enabling the brightness of the one or more portions of the display screen to be adjusted comprises enabling the brightness to be increased if the or more portions are determined to be included in a focus area.

14. The method of claim 13, wherein the one or more portions are determined to be included in the focus area if the one or more portions include an active window.

15. The method of claim 13, wherein the one or more portions are determined to be included in the focus area if the one or more portions is within a vicinity of a cursor.

16. The method of claim 15, wherein the one or more portions and the remaining portion are portions of a single window.

17. The method of claim 11, wherein enabling the brightness of the more portions of the display screen to be adjusted includes storing instructions in the computer system to adjust the brightness of the one or more portions of the display screen.

18. An apparatus, comprising:

an image capturing device to capture a first image a users face to determine a first focus area on a display screen, the first focus area corresponding to a location on the display screen the user is looking at a first time, wherein brightness of at least one portion of the display screen outside of the first focus area is reduced.

19. The apparatus of claim 18 wherein the image capturing device is to capture a second image of the user's face to determine a second focus area on the display screen, the second focus area corresponding to a location on the display screen the user is looking at a second time.

20. The apparatus of claim 19, wherein the image capturing device is to analyze the first image or the second image to determine position of a cursor on the display screen.

21. The apparatus of claim 20, wherein the position of the cursor on the display screen corresponds to the first focus area or the second focus area.

22. The apparatus of claim 21, wherein the wherein the first focus area or the second focus area is within a vicinity of the position of the cursor on the display screen.

* * * * *